United States Patent
Satou et al.

(10) Patent No.: US 9,027,414 B2
(45) Date of Patent: May 12, 2015

(54) ULTRASONIC FLOW RATE MEASUREMENT DEVICE WITH TEMPERATURE SENSING CIRCUIT

(75) Inventors: Masato Satou, Nara (JP); Yuji Fujii, Nara (JP); Hirokazu Goto, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 198 days.

(21) Appl. No.: 13/805,221

(22) PCT Filed: May 20, 2011

(86) PCT No.: PCT/JP2011/002820
§ 371 (c)(1),
(2), (4) Date: Dec. 18, 2012

(87) PCT Pub. No.: WO2011/161873
PCT Pub. Date: Dec. 29, 2011

(65) Prior Publication Data
US 2013/0091958 A1    Apr. 18, 2013

(30) Foreign Application Priority Data

Jun. 24, 2010 (JP) ................................. 2010-143476

(51) Int. Cl.
*G01F 1/66* (2006.01)

(52) U.S. Cl.
CPC ........ *G01F 1/66* (2013.01); *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 4,445,389 A | * | 5/1984 | Potzick et al. | ............. 73/861.27 |
| 6,708,570 B2 | * | 3/2004 | Matsushima et al. | ...... 73/861.28 |
| 7,093,502 B2 | * | 8/2006 | Kupnik et al. | ............. 73/861.29 |
| 7,213,468 B2 | * | 5/2007 | Fujimoto | ................... 73/861.27 |
| 7,509,878 B2 | * | 3/2009 | Sato et al. | .................. 73/861.25 |
| 2009/0178490 A1 | * | 7/2009 | Konzelmann et al. | ..... 73/861.29 |

(Continued)

FOREIGN PATENT DOCUMENTS

| | | |
|---|---|---|
| JP | 10-239123 A | 9/1998 |
| JP | 2004-212288 A | 7/2004 |

(Continued)

OTHER PUBLICATIONS

International Search Report for International Application No. PCT/JP2011/002820, dated Jun. 14, 2011, 1 page.

*Primary Examiner* — Harshad R Patel
(74) *Attorney, Agent, or Firm* — Brinks Gilson & Lione

(57) ABSTRACT

An ultrasonic flow rate measurement device capable of sensing and correcting a temperature without use of a sensor specifically designed for measuring a temperature is provided. The ultrasonic flow rate measurement device includes a first ultrasonic transducer and a second ultrasonic transducer that re disposed in a flow volume measurement block and arranged in such a way that ultrasonic waves are transmitted from one transducer and received by the other transducer; a counter for measuring a propagation time consumed for exchanging the ultrasonic waves between the first ultrasonic transducer and the second ultrasonic transducers; a flow volume computing block that calculates a flow volume from a measurement value of the counter; an oscillation circuit used as a time counter when the counter calculates the propagation time; and a temperature sensing block for sensing a temperature by utilization of a frequency change attributable to a temperature of the oscillation circuit.

4 Claims, 6 Drawing Sheets

(56) References Cited

U.S. PATENT DOCUMENTS

2012/0272748 A1* 11/2012 Watanabe et al. .......... 73/861.18
2013/0081477 A1* 4/2013 Gotou et al. ............... 73/861.02

FOREIGN PATENT DOCUMENTS

| | | |
|---|---|---|
| JP | 3651110 B2 | 5/2005 |
| JP | 2009-092548 A | 4/2009 |

* cited by examiner

ULTRASONIC FLOW RATE MEASUREMENT DEVICE WITH TEMPERATURE SENSING CIRCUIT

This application is a 371 application of PCT/JP2011/002820 having an international filing date of May 20, 2011, which claims priority to JP2010-143476 filed Jun. 24, 2010, the entire contents of which are incorporated herein by reference.

TECHNICAL FIELD

The invention relates to an ultrasonic transducer for transmitting and receiving an ultrasonic pulse and a device for measuring a flow volume and a flow rate of a gas and a fluid by use of the ultrasonic transducer.

BACKGROUND ART

As shown in FIG. 6, in a hitherto ultrasonic flow rate measurement device of this type, an oscillation circuit 3 performs oscillation for a given period of time with an operating frequency set by frequency control means 4 in accordance with a start signal from a control block 6, thereby activating a first ultrasonic probe 2. Ultrasonic waves emitted from the first ultrasonic probe 2 propagate through a fluid to be measured with which a measurement flow path 1 is filled, and a second ultrasonic probe 7 detects the ultrasonic waves after elapse of a time "t." A comparator 9 compares a thus-detected received signal with a reference voltage 8. When a voltage relationship between the reference voltage 8 and the receive signal has become inverted, a stop signal is sent to a timer 5, to thus deactivate the timer 5.

A thermistor 10 for sensing a temperature is disposed in the measurement flow path 1, thereby measuring a temperature of the fluid to be measured.

CITATION LIST

Patent Literature

Patent Document 1: Japanese Patent No. 3651110

SUMMARY OF INVENTION

Technical Problem

However, since the existing flow rate measurement device has the temperature sensing means disposed in the measurement flow path, a turbulence occurs in the fluid to be measured, a density distribution of the fluid to be measured is thereby be distorted within a range where time measurement is performed by means of ultrasonic waves, which might hinder uniform transmission and receipt of the ultrasonic waves and correct measurement of a propagation time of the ultrasonic waves.

The invention solves the problem, thereby enabling performance of temperature sensing without use of a thermistor and also enabling performance of temperature correction, or the like.

Solution to Problem

According to one aspect of the present invention, there is provided an ultrasonic flow rate measurement device comprising: a flow volume measurement block through which a fluid to be measured flows; a pair of ultrasonic transducers that are disposed in the flow volume measurement block and that transmit ultrasonic waves from one of the pair of ultrasonic transducers and receive the ultrasonic waves by the other of the pair of ultrasonic transducers; a propagation time measurement block for measuring a propagation time of the ultrasonic waves exchanged between the pair of ultrasonic transducers; a flow volume computing block that calculates a flow volume from a value measured by the propagation time measurement block; and a temperature sensing block for sensing a temperature by measuring a characteristic of a component that has a temperature characteristic and that makes up the propagation time measurement block or the flow volume computing block. This constitution makes a thermistor for temperature sensing unnecessary.

Advantageous Effects of Invention

Since the ultrasonic flow rate measurement device of the invention senses a temperature by utilization of a frequency change attributable to a temperature of an oscillation circuit block, a thermistor for temperature sensing becomes unnecessary, which enables cost cutting. Moreover, since there is no necessity to dispose a thermistor in an ambient atmosphere of fluid to be measured, a turbulence will not occur in the fluid to be measured, which also enables measurement of a flow rate and performance of temperature sensing.

DESCRIPTION OF EMBODIMENTS

Figure 1:
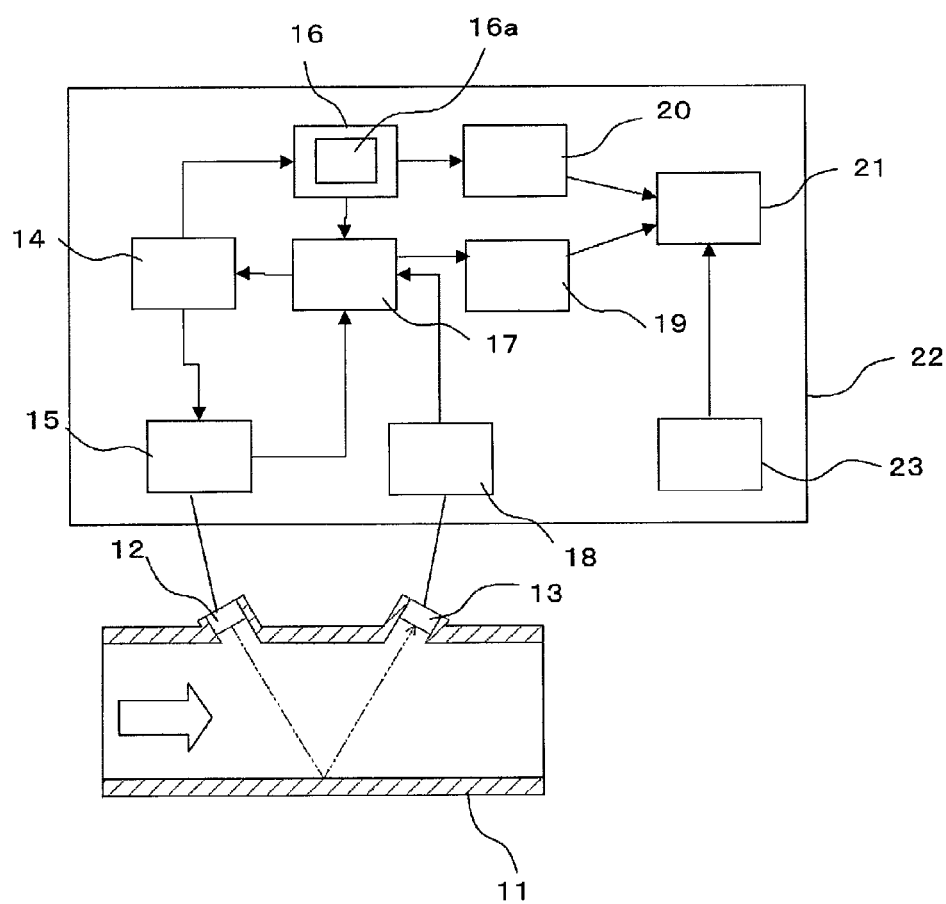
FIG. 1 is an overall block diagram of an ultrasonic flow rate measurement device of a first embodiment.

A first invention is an ultrasonic flow rate measurement device comprising: a flow volume measurement block through which a fluid to be measured flows; a pair of ultrasonic transducers that are disposed in the flow volume measurement block and configured to transmit ultrasonic waves from one of the pair of ultrasonic transducers and receive the ultrasonic waves by the other of the pair of ultrasonic transducers; a propagation time measurement block configured to measure a propagation time of the ultrasonic waves exchanged between the pair of ultrasonic transducers; a flow volume computing block configured to calculate a flow volume from a value measured by the propagation time measurement block; and a temperature sensing block configured to sense a temperature by measuring a characteristic of a component that has a temperature characteristic and that makes up the ultrasonic flow rate measurement device.

A temperature can be measured by measurement of a characteristic of a component (e.g., a resistor, a capacitor, an oscillator, or the like) whose characteristic changes while depending on a temperature, among components that make up the ultrasonic flow rate measurement device. Hence, a thermistor, or the like, that is a component specifically intended for temperature sensing becomes unnecessary, which enables cost cutting.

A second invention is the ultrasonic flow rate measurement device according to the first invention, wherein the component having the temperature characteristic is an oscillator of an oscillation circuit block used as a reference clock employed by the propagation time measurement block configured to measure a propagation time; and wherein the temperature sensing block is configured to sense a temperature by measuring a frequency of the oscillator.

Temperature sensing is carried out by utilization of a frequency change attributable to a temperature of the oscillation circuit, which obviates a necessity for a thermistor, or the like, that is a component specifically intended for temperature sensing. Accordingly, cost cutting becomes possible.

A third invention is the ultrasonic flow rate measurement device according to the first or second invention, wherein the component having the temperature characteristic is disposed in an ambient atmosphere of the fluid to be measured.

Accordingly, the temperature sensing block can measure a temperature correctly.

A fourth invention is the ultrasonic flow rate measurement device according to any one of the first through third invention, further comprising: a pressure sensing block configured to sense pressure of the fluid to be measured; and a calorie calculating block configured to calculate a calorie of the fluid to be measured from a flow volume value of the fluid to be measured that has been calculated by the flow volume computing block, the temperature sensed by the temperature sensing block, and a pressure value of the fluid to be measured sensed by the pressure sensing block.

Accordingly, calorimetric measurement becomes feasible.

A fifth invention is the ultrasonic flow rate measurement device according to the second invention, further comprising: a case body having a fluid feeding block and a fluid discharge block; the flow volume measurement block disposed in the case body; a rectifying member provided on a feed side of the flow volume measurement block; and a discharge connection member that connects a discharge side of the flow volume measurement block to the fluid discharge block, wherein a cross section of a flow path of the flow volume measurement block is formed into a shape of a rectangle; the pair of ultrasonic transducers are disposed on a short-side part of the cross section, and the ultrasonic waves transmitted from one of the pair of ultrasonic transducers are received by the other ultrasonic transducer after having undergone reflection on an opposite short-side interior wall of the flow path; and wherein a measurement circuit board that includes terminals by way of which a voltage is applied to the ultrasonic transducers, the propagation time measurement block, the oscillation circuit block, and the temperature sensing block are coated with an insulation layer.

The measurement circuit board and the flow volume measurement block are assembled integrally and set in an ambient atmosphere of fluid to be measured, thereby enabling easy sensing of a temperature of the fluid to be measured and assurance of insulation.

The ultrasonic flow rate measurement devices of the embodiments of the invention will be hereunder described by reference to the drawings. Throughout the drawings, like elements are assigned like reference numerals, and their detailed explanations are omitted.

(First Embodiment)

FIG. 1 is an overall block diagram of an ultrasonic flow rate measurement device of a first embodiment of the invention. In FIG. 1, a first ultrasonic transducer 12 that transmits ultrasonic waves and a second ultrasonic transducer 13 that receives the ultrasonic waves are disposed along a flow direction in a flow path of a flow volume measurement block 11. Upon outputting a measurement initiation signal to a drive circuit 15, a control block 14 activates an oscillation circuit 16, thereby letting a counter 17 start time measurement. Upon receipt of the signal, the drive circuit 15 activates the first ultrasonic transducer 12, thereby emitting ultrasonic waves. The thus-emitted ultrasonic waves propagate through the fluid and are received by the second ultrasonic transducer 13. A receipt sensing circuit 18 takes the thus-received ultrasonic wave signal as an input, subjects the signal to signal processing, and outputs the processed signal to the counter 17 that serves as a propagation time measurement block.

Upon receipt of the input signal from the receipt sensing circuit 18, the counter 17 stops time measurement and deactivates the oscillation circuit 16. A flow volume computing block 19 receives a result of time measurement performed by the counter 17 and determines a flow volume by means of computation.

The oscillation circuit 16 serving as an oscillation circuit block is made up of an oscillator 16a and used as a reference clock when the counter 17 measures a propagation time. A temperature sensing block 20 measures a frequency of the oscillator 16a whose oscillating frequency changes while depending on a temperature, thereby enabling temperature sensing. Specifically, the temperature sensing block 20 measures the oscillating frequency of the oscillator 16a by means of an oscillator (e.g., a crystal oscillator) resistant to a frequency change due to a temperature, thereby calculating a temperature of an ambient atmosphere of fluid to be measured. In this case, the oscillation circuit 16 corresponds to a component that makes up the ultrasonic flow rate measurement device and that exhibits a temperature characteristic, and is set in the ambient atmosphere of fluid to be measured while mounted on a measurement circuit board 22.

More, a calorie calculating block 21 determines a standard flow volume from a flow volume value (a volume flow) determined by the flow volume computing block 19, a temperature of the fluid to be measured determined by the temperature sensing block 20, and a pressure value of the fluid to be measured that has been measured by a pressure sensing block 23. Moreover, the calorie calculating block 21 calculates a calorie of the fluid to be measured from a known density and specific heat of the fluid to be measured. The control block 14, the drive circuit 15, the oscillation circuit 16, the counter 17, the receipt sensing circuit 18, the flow volume computing block 19, the temperature sensing block 20, the calorie calculating block 21, and the pressure sensing block 23 are mounted on the measurement circuit board 22.

Figure 2:
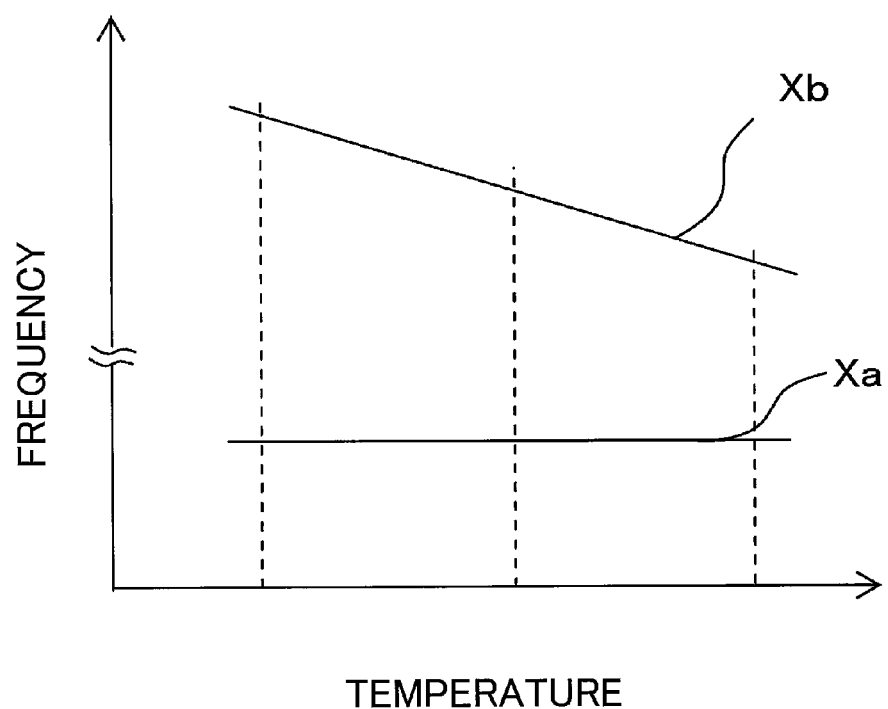
FIG. 2 is a characteristic diagram showing a relationship between a frequency of an oscillation circuit block and a temperature of a temperature sensing block of the ultrasonic flow rate measurement device.

FIG. 2 shows a relationship (Xb) between a temperature and a frequency of the oscillator 16a of the oscillation circuit 16 and a relationship (Xa) between a temperature and a frequency of the crystal oscillator resistant to a frequency change attributable to a temperature.

The temperature characteristics (Xa, Xb) of the crystal oscillator and the oscillator 16a are compared with each other, thereby enabling determination of temperatures.

In the embodiment, the oscillator of the oscillation circuit 16 is utilized as a component that makes up the ultrasonic flow rate measurement device and that exhibits a temperature characteristic to thereby measure a frequency change. However, the invention is not limited to this configuration. Needless to say, it is possible to utilize a component that is disposed in an ambient atmosphere of fluid to be measured and whose characteristic exhibits a predetermined change depending on a temperature (an ambient temperature of the fluid to be measured); for instance, a resistance value of a resistive element or a capacitance value of a capacitor mounted on a circuit that makes up a propagation time measurement block or a flow volume computing block on a measurement circuit board.

(Second Embodiment)

Figure 3:
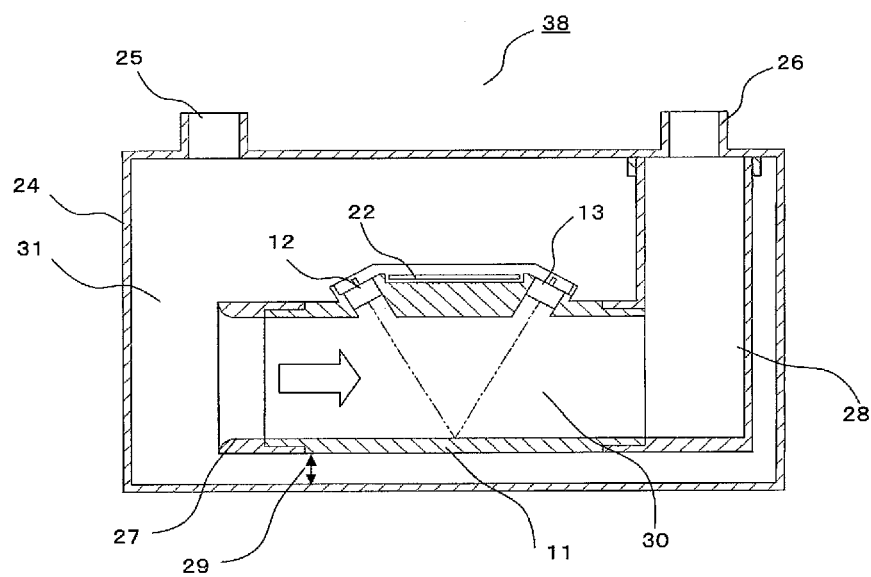
FIG. 3 is a configuration diagram of an ultrasonic flow rate measurement device of a second embodiment.

FIG. 3 is a configuration diagram of an ultrasonic flow rate measurement device of a second embodiment of the invention.

A case body 24 has a fluid feeding block 25 for feeding a fluid to be measured and a fluid discharge block 26 for discharging the fluid to be measured. The flow volume measurement block 11 having a pair of ultrasonic transducers (the first ultrasonic transducer 12 and the second ultrasonic transducer 13) and the measurement circuit board 22 is accommodated in the case body 24. A removable rectifying member 27 is disposed on a feed side of the flow volume measurement block 11, and a removable discharge connection member 28 to be connected to the fluid discharge block 26 is disposed on a discharge side of the same. A lower space 29 exists between the flow volume measurement block 11 and the case body 24.

Figure 4:
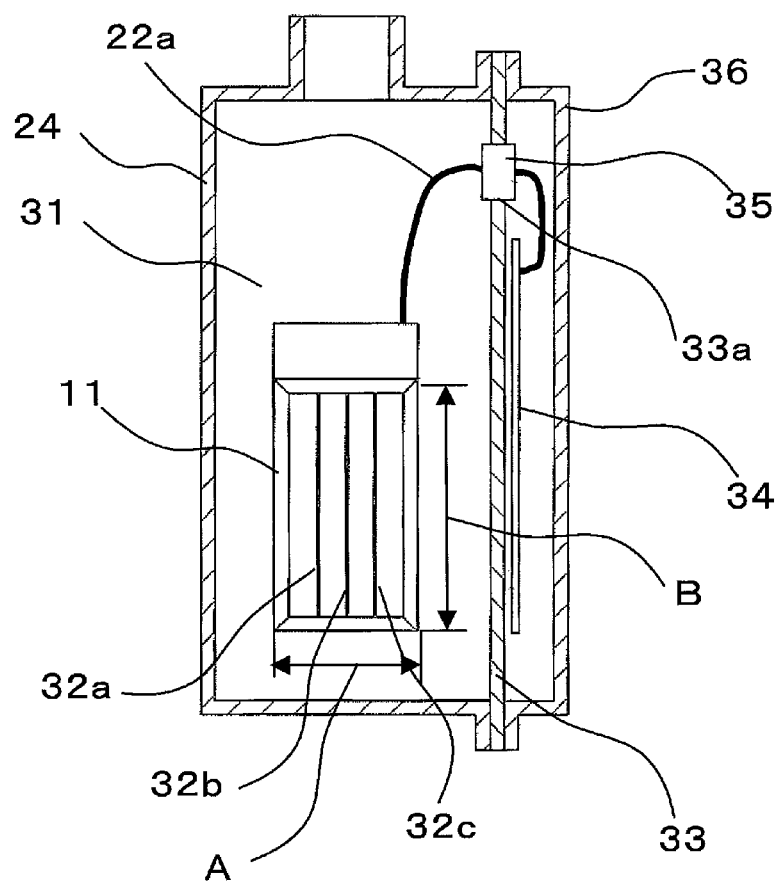
FIG. 4 is a cross sectional view of the ultrasonic flow rate measurement device.

FIG. 4 is a cross sectional view of the ultrasonic flow rate measurement device of the invention.

As shown in FIG. 4, the flow volume measurement block 11 is formed in such a way that the flow path assumes a rectangular cross sectional profile. Specifically, a longitudinal length B of the flow volume measurement block 11 is longer than a widthwise length A of the flow path cross section with reference to a flowing direction of the fluid. As shown in FIG. 3, in the flow volume measurement block 11, the pair of ultrasonic transducers 12 and 13 are disposed on a short side of the flow path cross section and configured such that ultrasonic waves emitted from one ultrasonic transducer are received by the other ultrasonic transducer after having undergone reflection on an opposite interior wall of the short-side flow path. Moreover, a plurality of partition plates 32a, 32b, and 32c are arranged substantially in parallel to a longitudinal surface of the flow volume measurement block 11 to keep rectified a flow in the measurement block of the fluid to be measured in such a way that an aspect ratio becomes greater, thereby splitting a flow path 30 of the flow volume measurement blocks into fours.

The case body 24 is provided with a case lid 33, and the case body 24 and the case lid 33 are sealed with unillustrated packing in such a way that the fluid to be measured will not leak from a gas chamber 31. A display block 34 for displaying a flow volume of the fluid to be measured that has been measured by the flow volume measurement block 11 and a lead wire 22a for electrically connecting the display block 34 to the measurement circuit board 22 are connected to the case lid 33 by way of a hole of a through section 33a. The through section 33a is sealed with a glass hermetic seal 35. Moreover, in order to protect the display block 34, a main body lid 36 is mounted to the case lid 33 and the case body 24 with unillustrated screws.

Figure 5:
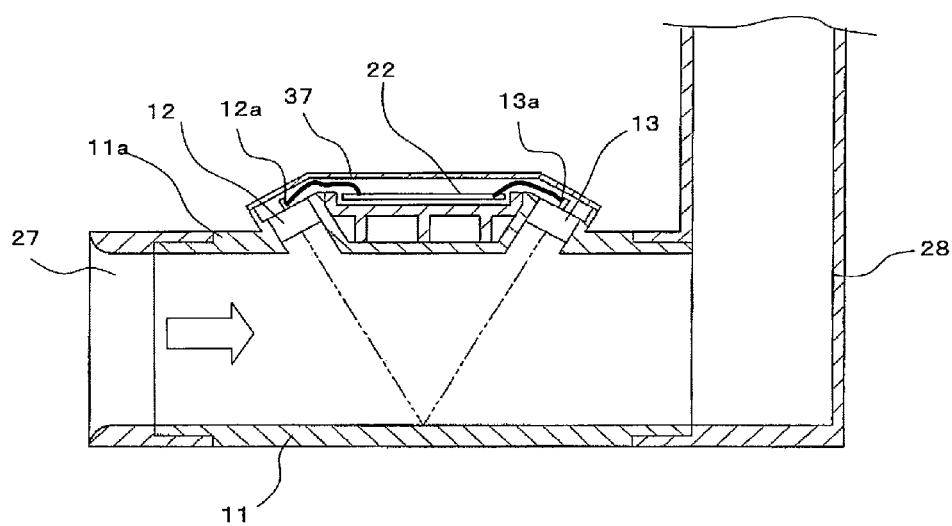
FIG. 5 is a cross sectional view of a flow volume measurement block of the ultrasonic flow rate measurement device.
Figure 6:
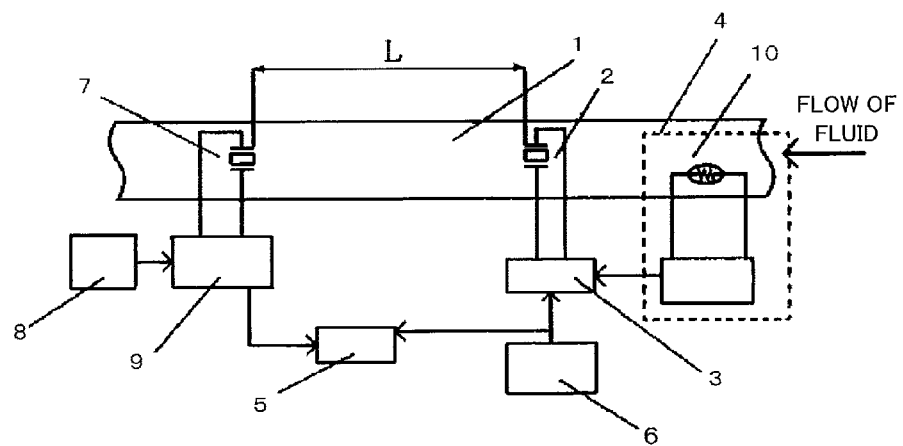
FIG. 6 is an overall block diagram of an existing ultrasonic flow rate measurement device.

FIG. 5 is an enlarged view of the flow volume measurement block. As illustrated, a terminal 12a by way of which a voltage is applied to the first ultrasonic transducer 12, a terminal 13a by way of which a voltage is applied to the second ultrasonic transducer 13, and the measurement circuit board 22 are coated with an insulating material 37 exhibiting an insulating characteristic so as to be integrated with a flow path member 11a. In addition to an insulating material, the insulating material 37 may be constituted by a material having exhibit superior gas resistance characteristic and superior solvent resistance characteristics. Moreover, the insulating material 37 can also be a multilayer structure.

When the insulating material 37 has a multilayer structure, it is better to employ a material which exhibits a higher degree of hardness as one for a layer to be positioned closer to the fluid to be measured from the viewpoint of diminishing the stress exerted on the circuit board.

Operation of the ultrasonic flow rate measurement device 38 is now described.

Since the upstream gas chamber 31 is configured so as to have a larger volume until the fluid to be measured fed from the fluid feeding block 25 enters the rectifying member 27, flows of the fluid to be measured interfere with each other, so that stable flows of the fluid can be assured. Moreover, even when the fluid to be measured involving pressure fluctuations flow into the gas chamber 31, pressure is lessened, so that a flow volume can be stably measured.

As a result of the lower space 29 being provided, even when objects other than the fluid to be measured, such as sand and water, are mixed into the fluid to be measured, the objects, or sand and water, build up in the lower space 29, thereby enabling prevention of occurrence of erroneous measurement.

Various changes and applications of the present invention may be made by those skilled in the art on the basis of the description of this specification and known techniques without departing from the spirit and scope of the present invention, and these are also included in the range of the request for protection. In addition, the respective components in the embodiments described above may be arbitrarily combined without departing from the scope of the invention.

This application is based on Japanese Patent Application (Japanese Patent Application No. 2010-143476) filed on Jun. 24, 2010, the disclosure of which is incorporated herein by reference in its entirety.

Industrial Applicability

As mentioned above, the ultrasonic flow rate measurement device of the invention can implement temperature measurement at a lower cost than that incurred by the existing ultrasonic flow rate measurement device. Therefore, the ultrasonic flow rate measurement device of the invention can also be applied to a flow volume measurement standard device, a gas meter and a calorie meter or a water meter.

The invention claimed is:

1. An ultrasonic flow rate measurement device comprising:
a flow volume measurement block through which a fluid to be measured flows;
a pair of ultrasonic transducers that are disposed in the flow volume measurement block and configured to transmit ultrasonic waves from one of the pair of ultrasonic transducers and receive the ultrasonic waves by the other of the pair of ultrasonic transducers;
a propagation time measurement block configured to measure a propagation time of the ultrasonic waves exchanged between the pair of ultrasonic transducers;
an oscillation circuit block used as a reference clock by the propagation time measurement block configured to measure a propagation time, wherein the oscillation circuit block includes an oscillator
a flow volume computing block configured to calculate a flow volume from a value measured by the propagation time measurement block; and
a temperature sensing block configured to sense a temperature by measuring a frequency of the oscillator.

2. The ultrasonic flow rate measurement device according to claim 1, wherein the component having the temperature characteristic is disposed in an ambient atmosphere of the fluid to be measured.

3. The ultrasonic flow rate measurement device according to claim 1, further comprising:
- a pressure sensing block configured to sense pressure of the fluid to be measured; and
- a calorie calculating block configured to calculate a calorie of the fluid to be measured from a flow volume value of the fluid to be measured that has been calculated by the flow volume computing block, the temperature sensed by the temperature sensing block, and a pressure value of the fluid to be measured sensed by the pressure sensing block.

4. The ultrasonic flow rate measurement device according to claim 1, further comprising:
- a case body having a fluid feeding block and a fluid discharge block;
- a rectifying member provided on a feed side of the flow volume measurement block; and
- a discharge connection member that connects a discharge side of the flow volume measurement block to the fluid discharge block, wherein the flow volume measurement block is disposed in the case body;

a cross section of a flow path of the flow volume measurement block is formed into a shape of a rectangle;

the pair of ultrasonic transducers are disposed on a short-side part of the cross section, and the ultrasonic waves transmitted from one of the pair of ultrasonic transducers are received by the other ultrasonic transducer after having undergone reflection on an opposite short-side interior wall of the flow path; and wherein a measurement circuit board that includes terminals by way of which a voltage is applied to the ultrasonic transducers, the propagation time measurement block, the oscillation circuit block, and the temperature sensing block are coated with an insulation layer.

* * * * *